(12) United States Patent
Urano et al.

(10) Patent No.: US 12,423,470 B2
(45) Date of Patent: Sep. 23, 2025

(54) CONTROL DEVICE, CONTROL METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Hiromitsu Urano, Numazu (JP); Takefumi Goto, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/201,342

(22) Filed: May 24, 2023

(65) Prior Publication Data
US 2023/0418973 A1 Dec. 28, 2023

(30) Foreign Application Priority Data

Jun. 28, 2022 (JP) .................................. 2022-103799

(51) Int. Cl.
*G06F 21/62* (2013.01)
*G06Q 10/02* (2012.01)
*G06Q 50/40* (2024.01)

(52) U.S. Cl.
CPC ......... *G06F 21/6245* (2013.01); *G06Q 10/02* (2013.01); *G06Q 50/40* (2024.01)

(58) Field of Classification Search
CPC ..... G06F 21/6245; G06Q 50/40; G06Q 10/02
See application file for complete search history.

(56) References Cited

U.S. PATENT DOCUMENTS

| 9,074,904 | B1 * | 7/2015 | Huang | G01C 21/3438 |
| 10,602,329 | B2 * | 3/2020 | Addepalli | H04W 40/20 |
| 2012/0253654 | A1 * | 10/2012 | Sun | G06Q 10/02 |
| | | | | 701/465 |
| 2014/0129578 | A1 * | 5/2014 | Lehmann | G06F 16/954 |
| | | | | 707/E17.014 |
| 2014/0207375 | A1 * | 7/2014 | Lerenc | G01C 21/3626 |
| | | | | 701/527 |

(Continued)

FOREIGN PATENT DOCUMENTS

| JP | 2019-007761 A | 1/2019 |
| JP | 2019-133354 A | 8/2019 |

(Continued)

*Primary Examiner* — Sargon N Nano
(74) *Attorney, Agent, or Firm* — Dinsmore & Shohl LLP (57) ABSTRACT

The control device includes an information processing device and a communication device. The information processing device extracts a group of users from the plurality of users based on passenger information of the plurality of users, the group of users being a group of users whose relationship with each other is a predetermined personal relationship, transmits to information terminal devices carried by the users belonging to the group, via the communication device, first display information indicating a current position of the shared vehicle, and transmits, in a case where a protection target user for whom a predetermined privacy protection requirement is satisfied is included in the group, second display information that is processed to protect privacy of the protection target user, to an information terminal device carried by a user not belonging to the group, via the communication device.

6 Claims, 10 Drawing Sheets

CONTENTS DISPLAYED ON INFORMATION TERMINAL DEVICE OF USER B BASED ON USE STATES OF USERS

| | | STATE OF USER B | | |
| | | BEFORE ESTABLISHMENT OF RESERVATION | AFTER ESTABLISHMENT OF RESERVATION | | |
| | | | BEFORE BOARDING | BOARDING (INCLUDES ON BOARD) | ALIGHTING |
| STATE OF USER A (PROTECTION TARGET USER) | USE | DUMMY POSITION IS DISPLAYED | DUMMY POSITION IS DISPLAYED | CURRENT POSITION OF SHARED VEHICLE IS DISPLAYED | CURRENT POSITION OF SHARED VEHICLE IS DISPLAYED |
| | NON-USE | CURRENT POSITION OF SHARED VEHICLE IS DISPLAYED | | | |

(56) References Cited

U.S. PATENT DOCUMENTS

| | | | |
|---|---|---|---|
| 2015/0142484 A1* | 5/2015 | Huang | G06Q 50/40 |
| | | | 705/7.11 |
| 2018/0374016 A1* | 12/2018 | Sano | G05D 1/0212 |
| 2019/0172170 A1* | 6/2019 | Jabour | G06Q 10/02 |
| 2020/0025580 A1* | 1/2020 | Matsuda | G01C 21/3453 |
| 2020/0034941 A1 | 1/2020 | Nakanishi et al. | |
| 2020/0065869 A1* | 2/2020 | Tiderington | G06Q 20/227 |
| 2021/0150434 A1* | 5/2021 | Keen | G06Q 10/06311 |
| 2022/0231985 A1* | 7/2022 | Rapaport | H04L 67/306 |

FOREIGN PATENT DOCUMENTS

| | | | |
|---|---|---|---|
| JP | 2020-017060 A | | 1/2020 |
| JP | 2022057113 A | * | 4/2022 |

* cited by examiner

CONTENTS DISPLAYED ON INFORMATION TERMINAL DEVICE
OF USER B BASED ON USE STATES OF USERS

| | | STATE OF USER B | | | |
|---|---|---|---|---|---|
| | | BEFORE ESTABLISHMENT OF RESERVATION | AFTER ESTABLISHMENT OF RESERVATION | | |
| | | | BEFORE BOARDING | BOARDING (INCLUDES ON BOARD) | ALIGHTING |
| STATE OF USER A (PROTECTION TARGET USER) | USE | DUMMY POSITION IS DISPLAYED | DUMMY POSITION IS DISPLAYED | CURRENT POSITION OF SHARED VEHICLE IS DISPLAYED | CURRENT POSITION OF SHARED VEHICLE IS DISPLAYED |
| | NON-USE | CURRENT POSITION OF SHARED VEHICLE IS DISPLAYED | | | |

CONTENTS DISPLAYED ON INFORMATION TERMINAL DEVICE
OF USER B BASED ON USE STATES OF USERS

| | | STATE OF USER B | | | |
|---|---|---|---|---|---|
| | | BEFORE ESTABLISHMENT OF RESERVATION | AFTER ESTABLISHMENT OF RESERVATION | | |
| | | | BEFORE BOARDING | BOARDING (INCLUDES ON BOARD) | ALIGHTING |
| | | | TEMPORAL DISTANCE IS EQUAL TO OR GREATER THAN THRESHOLD | TEMPORAL DISTANCE IS SMALLER THAN THRESHOLD | | |
| STATE OF USER A (PROTECTION TARGET USER) | USE | DUMMY POSITION IS DISPLAYED | DUMMY POSITION IS DISPLAYED | CURRENT POSITION OF SHARED VEHICLE IS DISPLAYED | CURRENT POSITION OF SHARED VEHICLE IS DISPLAYED | CURRENT POSITION OF SHARED VEHICLE IS DISPLAYED |
| | NON-USE | CURRENT POSITION OF SHARED VEHICLE IS DISPLAYED | | | |

CONTROL DEVICE, CONTROL METHOD, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2022-103799, filed Jun. 28, 2022, the contents of which application are incorporated herein by reference in their entirety.

BACKGROUND

Technical Field

The present disclosure relates to a control device, a control method, and a control program for controlling display contents that are displayed on a screen of an information terminal device carried by a user using a shared vehicle.

Background Art

JP 2019-133354 A discloses a technique of protecting privacy of at least one user among a plurality of users in a case where the plurality of users are sharing a shared vehicle. According to the technique, in the case where at least one user among a plurality of users is to get off, whether to protect privacy of the at least one user is determined based on an attribute of the user, such as sex or age, a combination of the attributes, or the like. In the case where privacy is determined to be protected, a predetermined protection action is taken. Note that examples of documents describing a level of a technique in a technical field related to the present disclosure can include JP 2020-017060 A in addition to JP 2019-133354 A.

SUMMARY

A case is conceivable where a plurality of users using a shared vehicle include users who know each other, such as family members or friends, for example. A case is considered where, at the time of users who know each other getting on board a shared vehicle, boarding positions of the users are different. When the conventional technique described above is applied to such a case, privacy of a user who gets on board the shared vehicle first is protected from a user who gets on board the shared vehicle second even though the users know each other. That is, a user who gets on board the shared vehicle second is not able to grasp the accurate position of a user who gets on board the shared vehicle first. This is because personal relationship between users is not taken into consideration at the time of determining whether to protect privacy from a user or not. Accordingly, the conventional technique described above is possibly inconvenient for some users.

An object of the present disclosure is to provide a technique according to which protection of privacy may be appropriately performed in relation to users who use a shared vehicle.

A first aspect is a control device for controlling display contents that are displayed on screens of information terminal devices carried by a plurality of users who use a same shared vehicle, and includes following features. The control device includes an information processing device and a communication device. The information processing device extracts a group of users from the plurality of users based on passenger information of the plurality of users, the group of users being a group of users whose relationship with each other is a predetermined personal relationship, transmits to information terminal devices carried by the users belonging to the group, via the communication device, first display information indicating a current position of the shared vehicle, and transmits, in a case where a protection target user for whom a predetermined privacy protection requirement is satisfied is included in the group, second display information that is processed to protect privacy of the protection target user, to an information terminal device carried by a user not belonging to the group, via the communication device.

A second aspect further includes the following feature in addition to the first aspect. In a case where a position of the shared vehicle moves out of a predetermined area around a position of alighting of the protection target user from the shared vehicle, the information processing device switches the display contents transmitted to the information terminal device carried by the user not belonging to the group from the second display information to the first display information.

A third aspect further includes the following feature in addition to the second aspect. In a case where the position of the shared vehicle moves out of the predetermined area around the position of alighting of the protection target user from the shared vehicle, the information processing device further switches the display contents transmitted to an information terminal device carried by the protection target user from the first display information to the second display information.

A fourth aspect further includes the following feature in addition to the first aspect. The predetermined privacy protection requirement includes at least one of a first requirement where a user belonging to the group is on board the shared vehicle before the user not belonging to the group, and a reservation for the shared vehicle is not yet fixed for the user not belonging to the group, a second requirement where the user belonging to the group gets on board the shared vehicle before the user not belonging to the group, the reservation for the shared vehicle is fixed for the user not belonging to the group, and the shared vehicle is positioned within a predetermined area around a position of boarding of the user belonging to the group on the shared vehicle, and a third requirement where the user belonging to the group gets off the shared vehicle before the user not belonging to the group gets on board the shared vehicle, the reservation for the shared vehicle is fixed for the user not belonging to the group, and the shared vehicle is positioned within a predetermined area around a position of alighting of the user belonging to the group from the shared vehicle.

A fifth aspect further includes the following feature in addition to the fourth aspect. The second requirement and the third requirement each further include that a temporal distance between the current position of the shared vehicle and a position where the user not belonging to the group gets on board the shared vehicle is equal to or greater than a threshold.

A sixth aspect further includes the following feature in addition to the first aspect. The personal relationship includes at least one of users whose reservations are made by a same person, users with a same address, and users with a same boarding position and a same alighting position.

A seventh aspect includes the following feature in addition to the first aspect. The second display information is information for causing a dummy position different from the current position of the shared vehicle to be displayed on the information terminal device. The dummy position is indicated by at least one of any position on an actually travelled route, any position on a scheduled travel route, any position on a route different from a travel route, a latest position that is obtained in a state where a cycle of acquisition of the current position is slowed, and a heat map where resolution of display of the current position is reduced.

An eighth aspect is a control method for controlling display contents that are displayed on screens of information terminal devices carried by a plurality of users who use a same shared vehicle, and includes following features. The control method includes extracting a group of users from the plurality of users based on passenger information of the plurality of users, the group of users being a group of users whose relationship with each other is a predetermined personal relationship; transmitting to information terminal devices carried by the users belonging to the group, via a communication device, first display information indicating a current position of the shared vehicle; and transmitting, in a case where a protection target user for whom a predetermined privacy protection requirement is satisfied is included in the group, second display information that is processed to protect privacy of the protection target user, to an information terminal device carried by a user not belonging to the group, via the communication device.

A ninth aspect is a control program for controlling display contents that are displayed on screens of information terminal devices carried by a plurality of users who use a same shared vehicle, and includes following features. The control program is for causing to computer to: extract a group of users from the plurality of users based on passenger information of the plurality of users, the group of users being a group of users whose relationship with each other is a predetermined personal relationship; transmit to information terminal devices carried by the users belonging to the group, via a communication device, first display information indicating a current position of the shared vehicle; and transmit, in a case where a protection target user for whom a predetermined privacy protection requirement is satisfied is included in the group, second display information that is processed to protect privacy of the protection target user, to an information terminal device carried by a user not belonging to the group, via the communication device. Note that the control program may be stored in a non-transitory computer-readable storage medium.

With the control device, the control method, and the control program of the present disclosure, a group of users where the relationship between the users is a predetermined personal relationship is extracted from the plurality of users, and information indicating the current position of the shared vehicle is displayed on information terminal devices carried by the users belonging to the group. In the case where a protection target user for whom the predetermined privacy protection requirement is satisfied is included in the group, information that is processed to protect privacy of the protection target user is displayed on an information terminal device carried by a user not belonging to the group. Accordingly, privacy of a protection target user may be appropriately protected based on the personal relationship between users who use the shared vehicle. A good balance may thereby be achieved between convenience of a user achieved by provision of accurate position information of the shared vehicle and protection of privacy of the protection target user.

DETAILED DESCRIPTION

A control device, a control method, and a control program according to an embodiment of the present disclosure will be described with reference to the appended drawings. Additionally, the control method and the control program according to the embodiment are implemented by computer processing by the control device according to the embodiment.

First Embodiment

1. Outline

It would be convenient for a user using a shared vehicle if a current position of the shared vehicle could be checked using an information terminal device (such as a smartphone or a tablet PC) carried by the user. This is because, firstly, arrival times at a boarding position and an alighting position of the user can be estimated. Secondly, the user can identify a target shared vehicle even when there are a plurality of shared vehicles having same or similar shapes, colors and the like.

However, a shared vehicle is used by a plurality of users, and there may arise a privacy-related issue that places related to personal information, such as home and workplace, may be identified by another user from information about the boarding position or the alighting position. More specifically, information about at least one position between the boarding position and the alighting position of a user who gets on board the shared vehicle first is grasped by another user who gets on board the shared vehicle later. Accordingly, when displaying information about the position of a vehicle on the information terminal device carried by a user, considerations should be given to privacy of another user.

Now, a relationship between users who use a shared vehicle will be considered. For example, in the case where the relationship between users corresponds to a predetermined personal relationship such as friends, the users probably already know each other's places related to personal information, such as home and workplace. In this case, it is assumed that there is no problem even when a user's accurate boarding position and alighting position become known to the other user. Accordingly, when the relationship between users who use a shared vehicle is a predetermined personal relationship, there is no problem even if accurate information about one user's boarding position and alighting position is displayed on the information terminal device carried by the other user.

However, when the relationship between users who use a shared vehicle is not a predetermined personal relationship, accurate information about one user's boarding position and alighting position is desirably not displayed on the information terminal device carried by the other user. Additionally, determination of whether the relationship between users is a predetermined personal relationship or not may be performed based on passenger information that is registered by the users at the time of use of the shared vehicle. The passenger information includes attribute information of the user that is registered in the information terminal device (name, address, sex, age, and the like), and reservation information of the user (boarding position, alighting position, person making the reservation, and the like).

A case is now considered where there are a plurality of groups of users whose relationship with each other is a predetermined personal relationship, and one of the groups includes a user whose privacy should be protected (hereinafter "protection target user"). Such a case requires a mechanism of extracting, from a plurality of users, a group of users where the relationship between the users is a predetermined personal relationship, and of identifying the protection target user included in the extracted group.

With a control device according to the present embodiment, a group of users where the relationship between the users is a predetermined personal relationship is extracted from a plurality of users based on the passenger information of the users. Furthermore, information about a current position of the shared vehicle is displayed on the information terminal devices carried by the users belonging to the group. Furthermore, if a protection target user for whom a privacy protection requirement is satisfied is not included in the group, information about the current position of the shared vehicle is also displayed on the information terminal device carried by a user not belonging to the group. However, in the case where a protection target user for whom a privacy protection requirement is satisfied is included in the group, information that is processed to protect privacy of the protection target user is displayed on the information terminal device carried by the user not belonging to the group. A good balance may thereby be achieved between convenience of a user achieved by provision of accurate position information of the shared vehicle and protection of privacy of a protection target user.

In the following, the control device according to the first embodiment will be described in detail.

2. Specific Example

2-1. Example Application of Control Device

Figure 1:
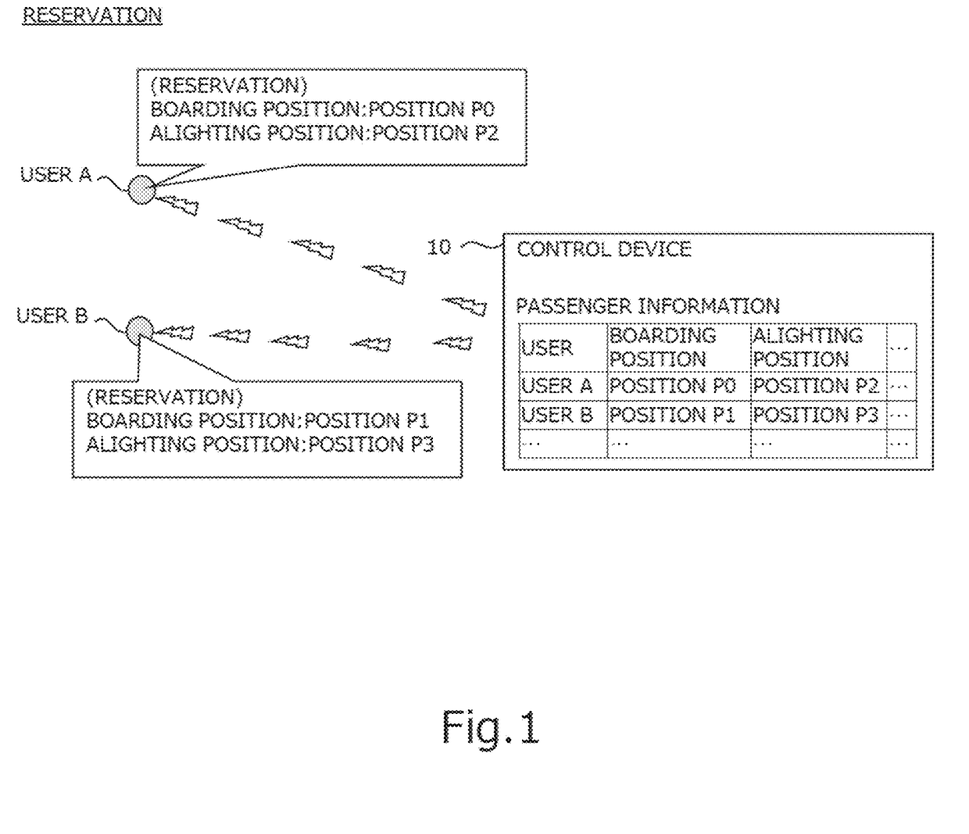
FIG. 1 is an explanatory diagram illustrating an example application of a control device according to a first embodiment.

FIG. 1 illustrates an example application of a control device 10 according to the first embodiment. The control device 10 is a server that is capable of performing communication with the information terminal device carried by a user who uses a shared vehicle 1. The shared vehicle 1 may be a vehicle that is driven by a person, or may be an autonomous vehicle. In the case where a user who is to use the shared vehicle 1 registers a reservation regarding a boarding position and an alighting position, the control device 10 obtains the passenger information via the information terminal device carried by the user. In the case where a reservation is registered by a plurality of users, the control device 10 obtains the passenger information of the plurality of users via the information terminal devices carried by the users. For example, as illustrated in FIG. 1, in the case where a user A and a user B who are to use the shared vehicle 1 each register a reservation regarding the boarding position and the alighting position, the control device 10 obtains the passenger information of each user via the information terminal devices carried by the user A and the user B.

Furthermore, the control device 10 performs a process in the manner described below based on the obtained passenger information, for example. The control device 10 extracts, from a plurality of users, a group of users where the relationship between the users is a predetermined personal relationship. The control device 10 identifies the protection target user from the extracted group. Then, the control device 10 transmits display information matching each user to the information terminal device carried by a user belonging to the same group as the protection target user and the information terminal device carried by a user not belonging to the group. Details of each step will be described below.

2-2. Group Extraction

An example of a step, performed by the control device 10, of extracting a group of users where the relationship between the users is a predetermined personal relationship will be described. With a method of performing group extraction, first, whether the relationship between users is a predetermined personal relationship or not is determined. More specifically, whether there is an item in the passenger information that is common between the users is determined based on the passenger information of the users obtained from the information terminal devices carried by the users. In the case where at least one item that is common between the users is included in the passenger information, the relationship between the users is determined to be a predetermined personal relationship. In the case where there is no item in the passenger information that is common between the users, the relationship between the users is not determined to be a predetermined personal relationship.

Figure 2:
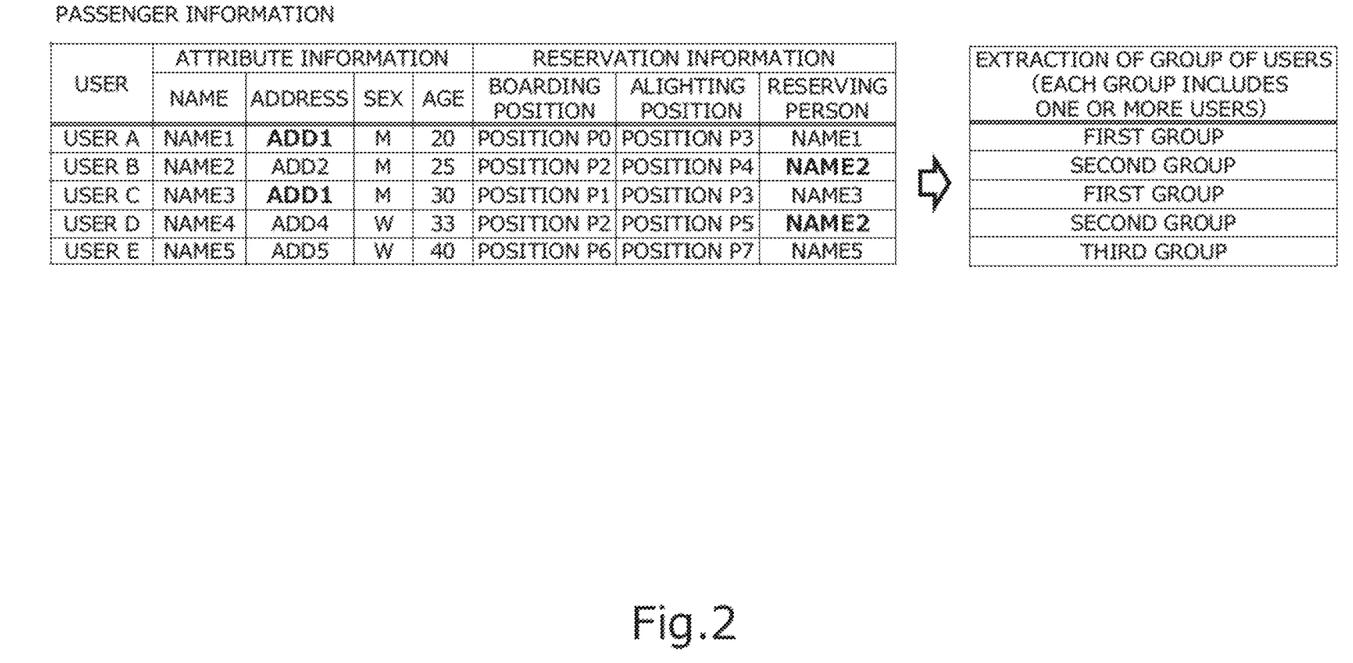
FIG. 2 is an explanatory diagram illustrating details of the example application of the control device.

As a more detailed example, a case is considered where, as illustrated in FIG. 2, five users A, B, C, D, and E are to use the same shared vehicle 1. Whether the relationships between the users is a predetermined personal relationship or not is determined based on the passenger information, of each user, including the attribute information and the reservation information, and an item "address" in the passenger information is found to be the same between the user A and the user C. Furthermore, an item "reserving person" in the passenger information is found to be the same between the user B and the user D, with the person making reservation being the user B. With respect to the user E, there is no item in the passenger information that is common with another user. In this case, the user A and the user C are determined to be users who in a predetermined personal relationship, and the user B and the user D are determined to be users who in a predetermined personal relationship. However, the user E is determined not to be a user who is in a predetermined personal relationship with any of the users A, B, C, and D. Additionally, a personal relationship means at least one of users with respect to whom the person making reservation is the same, users with the same address, and users with the same boarding position and the same alighting position.

After it is determined whether the relationship between users is a predetermined personal relationship or not, a group of users who are in the predetermined personal relationship is extracted. More specifically, as illustrated in FIG. 2, the user A and the user C are users who are in a predetermined personal relationship, and thus, the user A and the user C are extracted as a group of users (hereinafter referred to as "first group"). Furthermore, the user B and the user D are users who are in a predetermined personal relationship, and thus, the user B and the user D are extracted as a group of users (hereinafter referred to as "second group"). The user E is extracted as another group of users not belonging to the first nor the second group (that is, a third group illustrated in FIG. 2).

In this manner, even when there are a plurality of users, by determining whether a relationship between users is a predetermined personal relationship or not, a plurality of groups may be extracted with each group including users whose relationship with each other is a predetermined personal relationship. Additionally, each group that is extracted includes at least one user.

2-3. Identification of Protection Target User

An example of a step, performed by the control device 10, of identifying a protection target user from a group that is extracted will be described. First, following cases are conceivable in relation to identification of a protection target user. That is, there is a case where, depending of use states of users using the shared vehicle 1, a protection target user is not included in any group even though there are a plurality of groups. Furthermore, there is a case where, even though there is a protection target user in a group, privacy of the protection target user cannot be protected.

With the cases as described above in mind, when identifying a protection target user, whether the privacy protection requirement is satisfied for a user who uses the shared vehicle 1 first is determined based on states of users who use the shared vehicle 1. Details of the privacy protection requirement will be described with reference to FIG. 3 described below.

Figure 3:
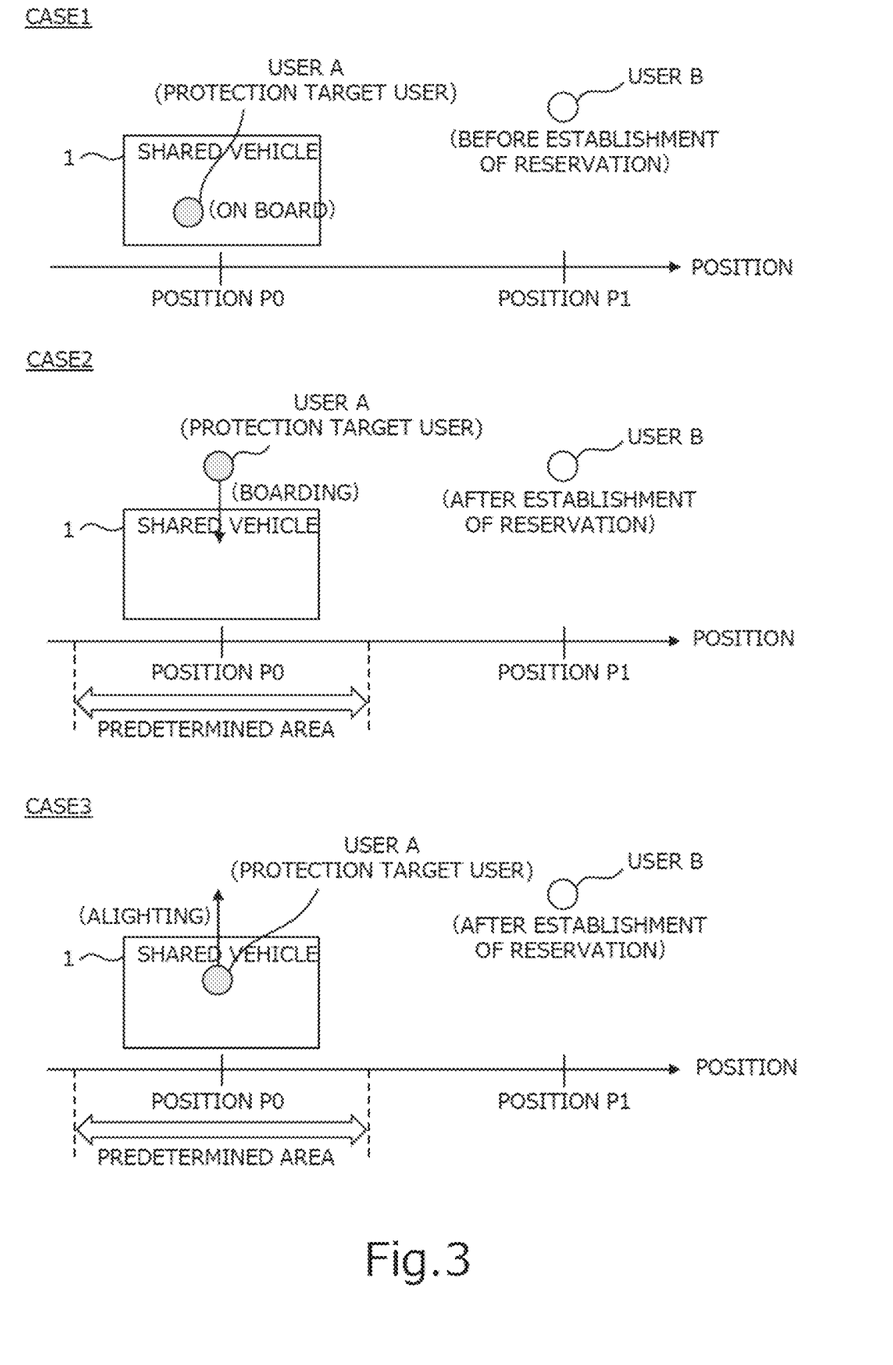
FIG. 3 is a diagram illustrating cases where a privacy protection requirement regarding a user is satisfied.

FIG. 3 is a diagram illustrating cases where the privacy protection requirement is satisfied for a user who uses the shared vehicle 1 first. In FIG. 3, a user who uses the shared vehicle 1 first will be referred to as a user A, and a user who uses the shared vehicle 1 second will be referred to as a user B. Furthermore, in FIG. 3, for the sake of simplicity, the user A and the user B are assumed to belong to different groups of users, and each group is assumed to include one user. As illustrated in FIG. 3, the privacy protection requirement includes at least one of three cases (case 1 will be referred to as a first requirement, case 2 as a second requirement, and case 3 as a third requirement). Case 1 (the first requirement) illustrated in FIG. 3 is a state where the user A is on board the shared vehicle 1, and a reservation for the shared vehicle 1 is not yet fixed for the user B. Case 2 (the second requirement) illustrated in FIG. 3 is a state where the user A is getting on board the shared vehicle 1, and a reservation for the shared vehicle 1 is fixed for the user B but the user B is not yet on board the shared vehicle 1. Case 3 (the third requirement) illustrated in FIG. 3 is a state where the user A is getting off the shared vehicle 1, and a reservation for the shared vehicle 1 is fixed for the user B but the user B is not yet on board the shared vehicle 1.

In case 1 illustrated in FIG. 3, for the user A, there is no problem even if the accurate position of the shared vehicle 1 becomes known to the user B. For the user B, there is no problem even if the accurate position of the shared vehicle 1 is not known. In this case, there is no need to inform a user for whom a reservation for the shared vehicle 1 is not yet fixed, of the accurate position of the shared vehicle 1. Accordingly, privacy of the user A is protected from the user B. In case 2 illustrated in FIG. 3, for the user A, the accurate position at the time of getting on board the shared vehicle 1 is better not known to the user B from the standpoint of privacy. In case 3 illustrated in FIG. 3, as in case 2, for the user A, the accurate position at the time of getting off the shared vehicle 1 is better not known to the user B from the standpoint of privacy. Accordingly, in both case 2 and case 3, privacy of the user A is protected from the user B. In this manner, the privacy protection requirement is satisfied in each of cases 1, 2, and 3, and thus, the user A may be identified as a protection target user in each case. In the example illustrated in FIG. 3, cases are illustrated where there is only one protection target user, but the number of protection target users may be more than one. More specifically, in the case where there is another user who is on board with the user A, the other user may be identified as a protection target user even when the user A and the other user are in the same group or in different groups.

Additionally, in case 2 illustrated in FIG. 3, when the shared vehicle 1 is at a position that is separate by a certain distance or more from the boarding position of the user A (a position P0 in FIG. 3), the boarding position of the user A is not spotted by the user B, and thus, privacy of the user A is protected from the user B. Accordingly, the user A may be identified as the protection target user in the case where the position of the shared vehicle 1 is within a predetermined area around the boarding position of the user A. Also in case 3 illustrated in FIG. 3, as in case 2, when the shared vehicle 1 is at a position that is separate by a certain distance or more from the alighting position of the user A (a position P0 in FIG. 3), the alighting position of the user A is not spotted by the user B, and thus, privacy of the user A is protected from the user B. Accordingly, the user A may be identified as the protection target user in the case where the position of the shared vehicle 1 is within a predetermined area around the alighting position of the user A.

2-4. Display Information

Figure 4:
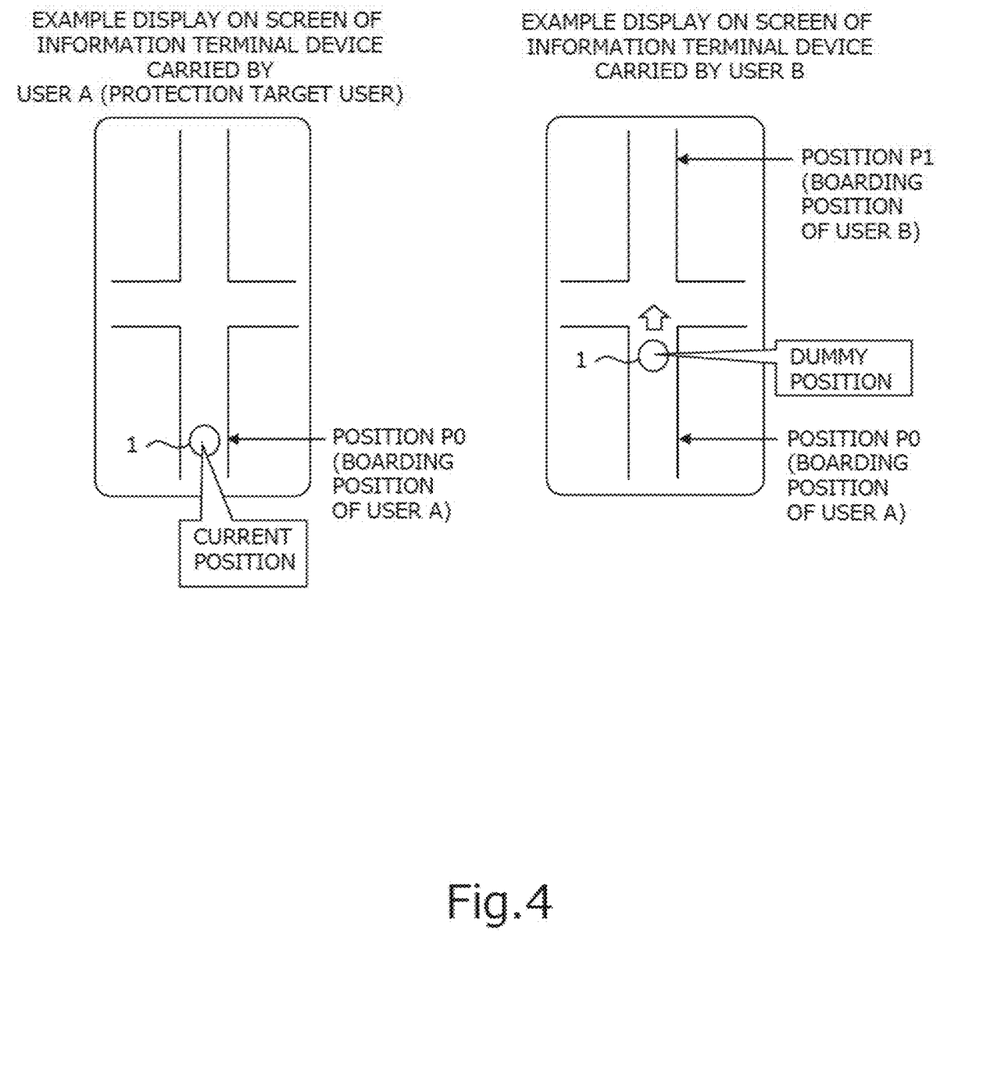
FIG. 4 is a diagram illustrating example display of display information that is transmitted to an information terminal device of a user.

FIG. 4 is a diagram illustrating example display of display information that is transmitted to the information terminal device carried by the user of the shared vehicle 1. FIG. 4 illustrates example display of display information that is transmitted to the information terminal device carried by each user, where the user A who is a protection target user gets on board at a position P0, and then, the user B who belongs to a different group from the user A gets on board at a position P1. In this case, display information that is processed such that the boarding position of the protection target user is not found out is displayed on a screen of the information terminal device of a user who does not belong to the same group as the protection target user. More specifically, the current position of the shared vehicle 1 is displayed on a screen of the information terminal device carried by the user A. However, a dummy position different from the current position of the shared vehicle 1 is displayed on the screen of the information terminal device carried by the user B.

An example of display on the screen of the information terminal device carried by the user B may be display of the shared vehicle 1 that is decelerating, or display of the shared vehicle 1 that is stopped at a position different from the boarding position of the user A. The dummy position may be any position on an actually travelled route, any position on a scheduled travel route, any position on a route different from the travel route, a latest position that is obtained in a state where a cycle of acquisition of the current position is slowed, or a heat map where resolution of display of the current position is reduced, for example. Additionally, the dummy position is indicated by at least one of those listed above.

Figure 5:
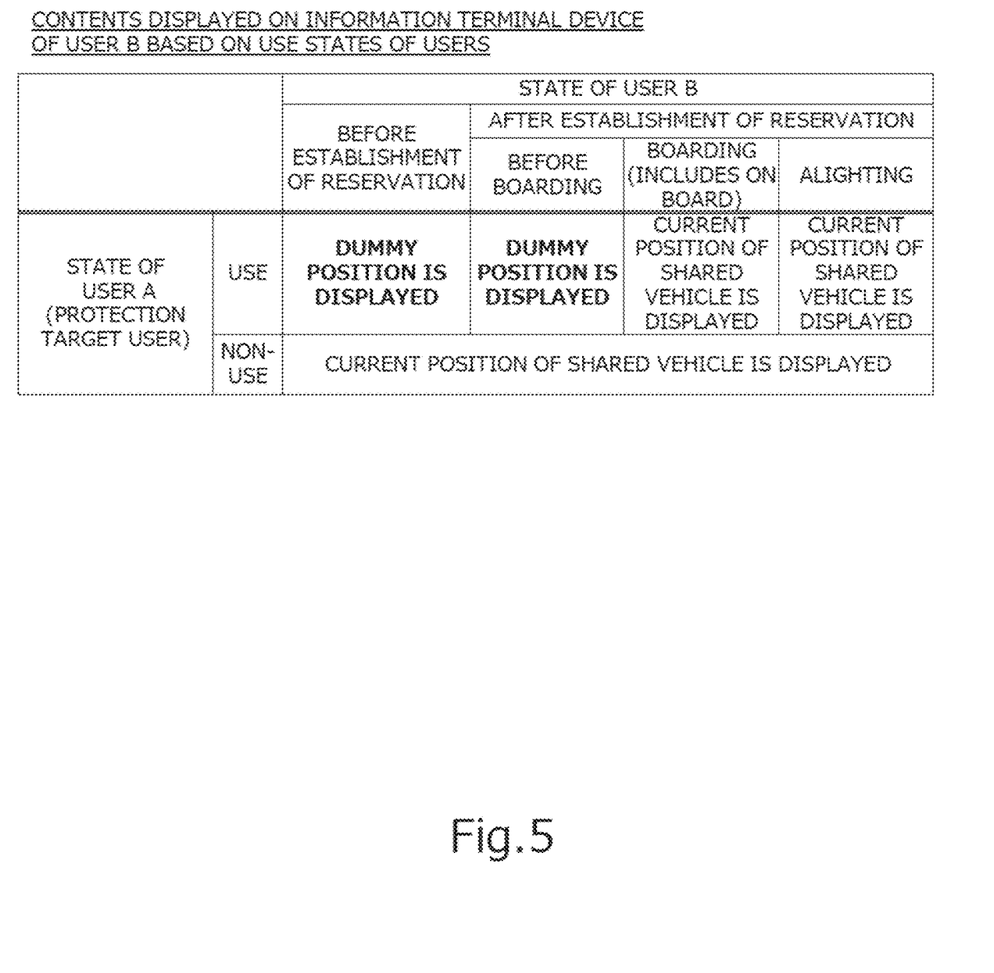
FIG. 5 is a diagram illustrating an example of display information that is displayed on the information terminal device of a user.

FIG. 5 is a diagram illustrating example display of display information that is displayed on the information terminal device of a user belonging to a different group from the protection target user, the display information being based on use states of the shared vehicle 1 by the protection target user and the aforementioned user. FIG. 5 illustrates an example of the display information that is displayed on the information terminal device of the aforementioned user in each of a case where the user A who is the protection target user is using the shared vehicle 1 before the user B and a case that is not a case where the user A is using the shared vehicle 1 before the user B.

More specifically, in the case where the user A is using the shared vehicle 1 before the user B, if the use state of the user B is a state before the reservation is fixed, the dummy position is displayed on the information terminal device of the user B. Furthermore, in the case where the user A is using the shared vehicle 1 before the user B, if the use state of the user B is a state after the reservation is fixed and before the user B gets on board, the dummy position is displayed on the information terminal device of the user B. However, in the case where the user A is using the shared vehicle 1 before the user B, if the use state of the user B is a state after the reservation is fixed and is a state where the user B is getting on board, is on board, or is getting off, the current position of the shared vehicle 1 is displayed on the information terminal device of the user B. Moreover, in the case where the user A is not using the shared vehicle 1 before the user B, the current position of the shared vehicle 1 is displayed on the information terminal device of the user B.

In this manner, display information indicating a dummy position is transmitted to the information terminal device that is carried by a user who does not belong to the same group as the protection target user. Accordingly, the boarding position or the alighting position of the protection target user who uses the shared vehicle 1 before the aforementioned user may be prevented from being grasped by the aforementioned user.

3. Control Device

3-1. Example Configuration

Figure 6:
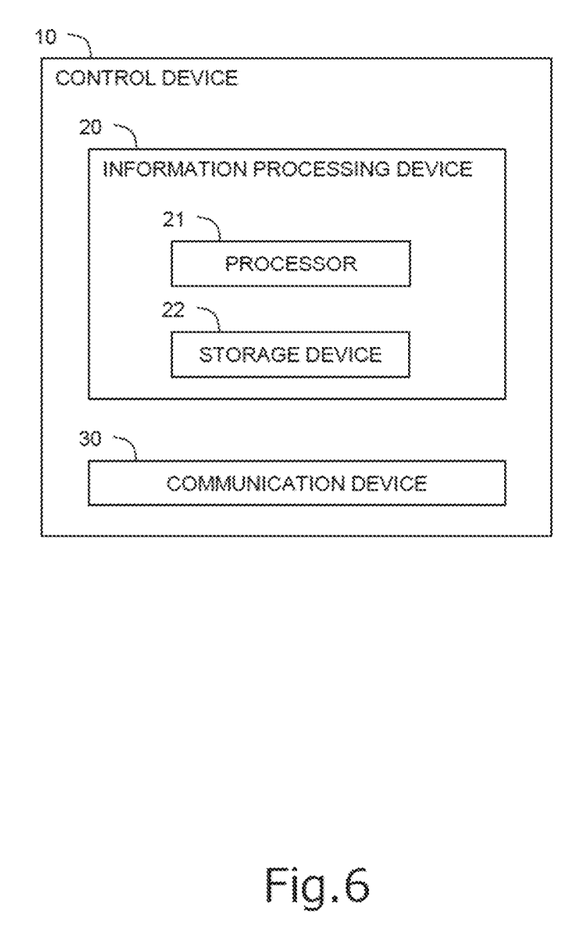
FIG. 6 is a block diagram illustrating an example configuration of the control device.

FIG. 6 is a block diagram illustrating an example configuration of the control device 10 according to the first embodiment. The control device 10 includes an information processing device 20 and a communication device 30. The information processing device 20 includes a processor 21 and a storage device 22.

The information processing device 20 performs various types of information processing. For example, the information processing device 20 may be an electronic control unit (ECU) or the like. The information processing device 20 includes at least one processor 21 (hereinafter simply referred to as "processor 21"), and at least one storage device 22 (hereinafter simply referred to as "storage device 22"). The processor 21 performs various types of processes. For example, the processor 21 may be a central processing unit (CPU). As the storage device 22, a volatile memory, a non-volatile memory, a hard disk drive (HDD), a solid state drive (SSD) and the like may be cited as examples. A function of the control device 10 is implemented by the processor 21 executing a control program that is a computer program. The control program is stored in the storage device 22. The control program may also be recorded in a computer-readable storage medium. The control program may also be provided via a network.

The communication device 30 transmits first display information indicating the current position of the shared vehicle 1, to the information terminal device carried by a user who belongs to the same group as the protection target user. Furthermore, the communication device 30 transmits second display information indicating the dummy position that is different from the current position of the shared vehicle 1, to the information terminal device carried by a user who belongs to a different group from the protection target user.

3-2. Example Processing

Figure 7:
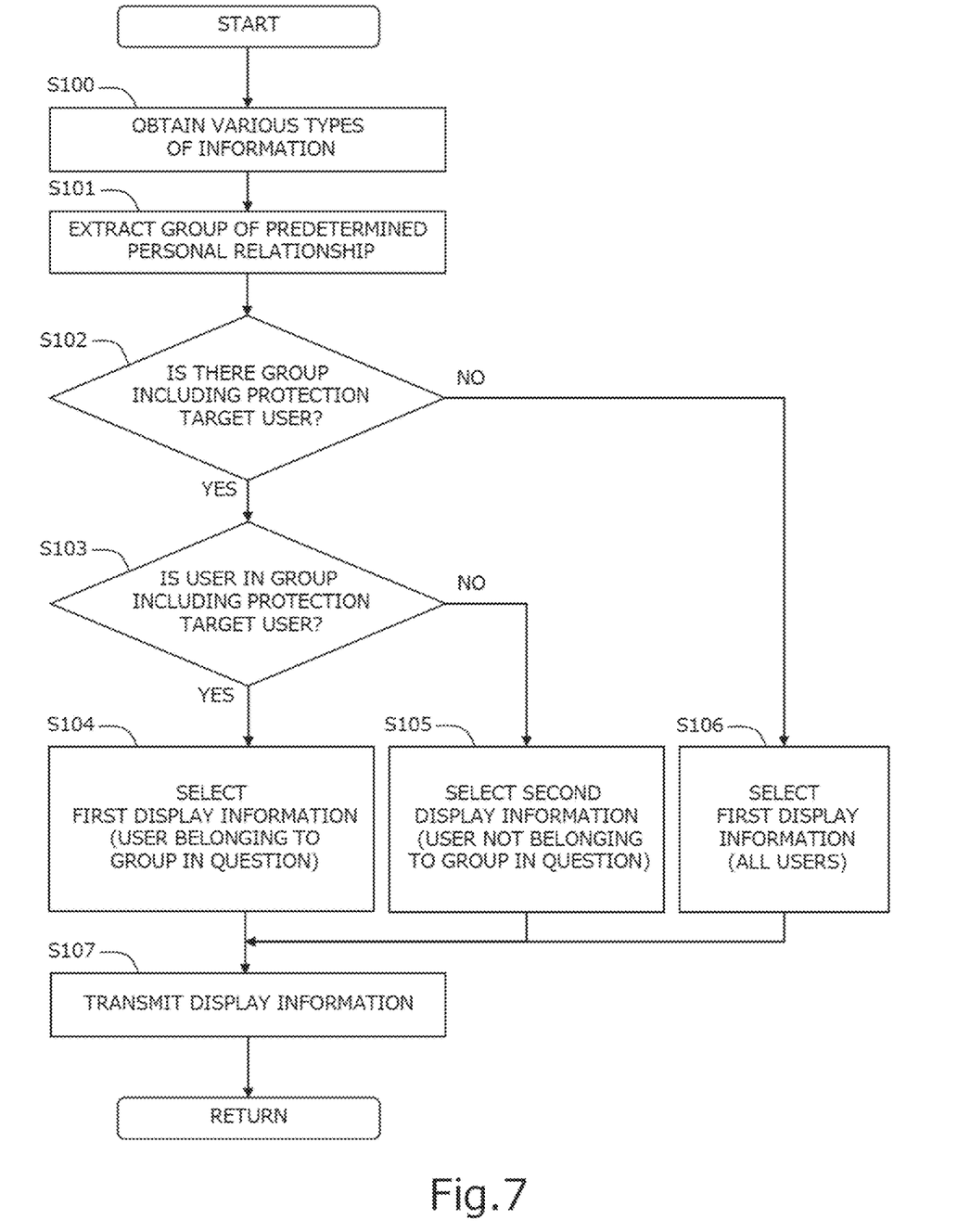
FIG. 7 is a flowchart illustrating example processing by an information process device of the control device.

FIG. 7 is a flowchart illustrating example processing by the information processing device 20. A routine illustrated in FIG. 7 is repeated every predetermined period of time.

In step S100, the information processing device 20 obtains various types of information stored in the storage device 22. Then, the process proceeds to step S101. Various types of information may be the passenger information of the user, position information of the shared vehicle 1, and the like, for example.

In step S101, the information processing device 20 extracts, from a plurality of users, a group of users where the relationship between users is a predetermined personal relationship, based on the passenger information of the plurality of users. Then, the process proceeds to step S102.

In step S102, the information processing device 20 determines whether there is a group that includes a protection target user or not. In the case where there is a group that includes a protection target user (step S102: Yes), the process proceeds to step S103. In other cases (step S102: No), the process proceeds to step S106.

In step S103, the information processing device 20 determines whether a user is a user in the group that includes the protection target user or not. In the case where the user is a user in the group that includes the protection target user (step S103: Yes), the process proceeds to step S104. In other cases (step S103: No), the process proceeds to step S105.

In step S104, the information processing device 20 selects the first display information as the display information to be displayed on the information terminal device carried by the user who belongs to the group. Then, the process proceeds to step S107.

In step S105, the information processing device 20 selects the second display information as the display information to be displayed on the information terminal device carried by the user who does not belong to the group. Then, the process proceeds to step S107.

In step S106, the information processing device 20 selects the first display information as the display information to be displayed on the information terminal device carried by each user who uses the shared vehicle 1. Then, the process proceeds to step S107.

In step S107, the information processing device 20 transmits the display information that is selected on a per-user basis to the information terminal device of each user.

4. First Modification

Figure 8:
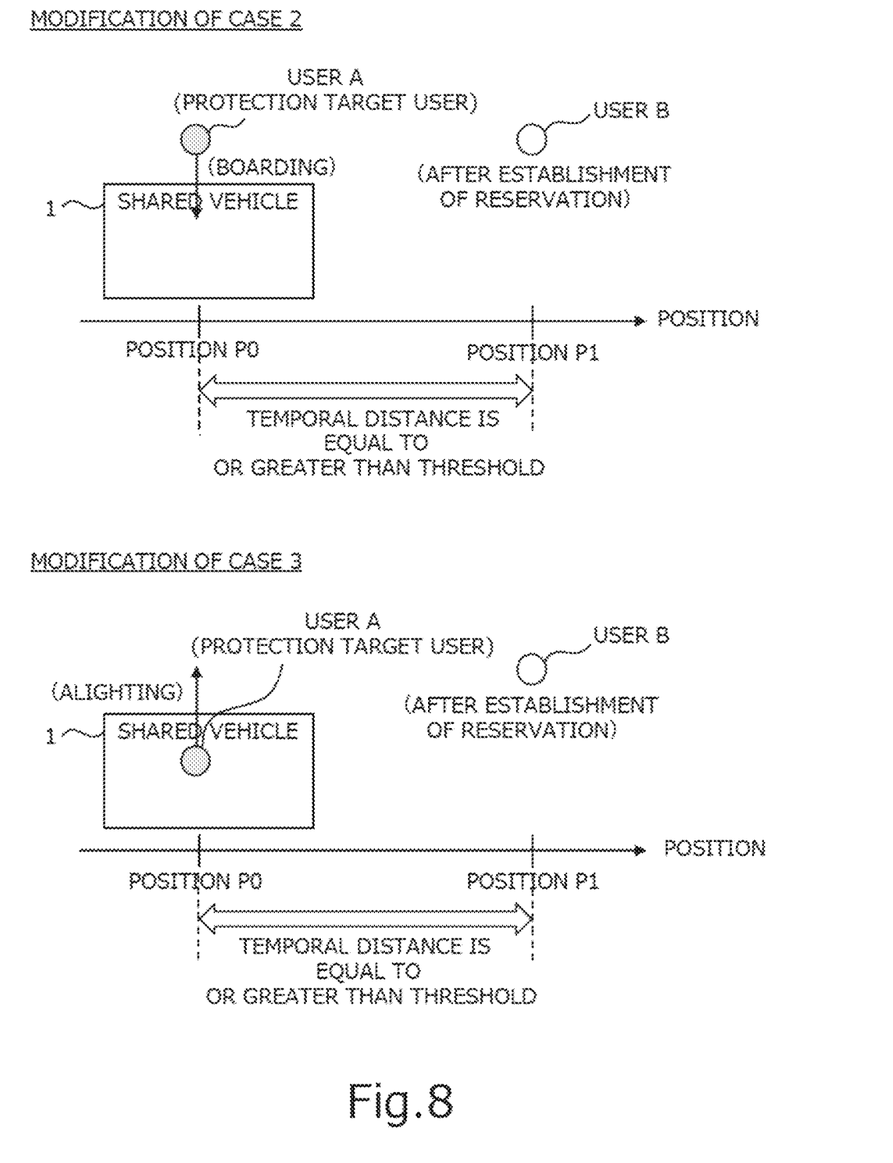
FIG. 8 is a diagram illustrating modifications of the privacy protection requirement regarding a user.

FIG. 8 is a diagram illustrating modifications of the privacy protection requirements of case 2 and case 3 illustrated in FIG. 3 described above. In case 2 and case 3 illustrated in FIG. 3 described above, privacy of a user who is using the shared vehicle 1 first is protected in cases where the position of the shared vehicle 1 is included in predetermined areas around the boarding position and the alighting position of the user. However, an inconvenience may occur also in the case where the position of the shared vehicle 1 is included within such a predetermined area. For example, as illustrated in FIG. 8, there may be cited a state where the user A who uses the shared vehicle 1 first is to get on board at a boarding position (a position P0) and the user B who uses the shared vehicle 1 next is scheduled to get on board at a boarding position (a position P1). In this case, if a temporal distance between the boarding position of the user A (the position P0) and the boarding position of the user B (the position P1) is small, the user B may possibly spot the boarding position of the user A. Also in the case where the user A gets off at an alighting position (a position P0), if a temporal distance between the alighting position of the user A (the position P0) and the boarding position of the user B (the position P1) is small, the user B may possibly spot the alighting position of the user A.

Accordingly, the privacy protection requirements of the first modification include that, in a case where there are a user who uses the shared vehicle 1 first (hereinafter referred to as "first user") and a user who uses the shared vehicle 1 second (hereinafter referred to as "second user"), the temporal distance between the boarding position of the first user and the boarding position of the second user is equal to or greater than a threshold. Furthermore, the privacy protection requirements of the first modification include that the temporal distance between the alighting position of the first user and the boarding position of the second user is equal to or greater than a threshold.

Figure 9:
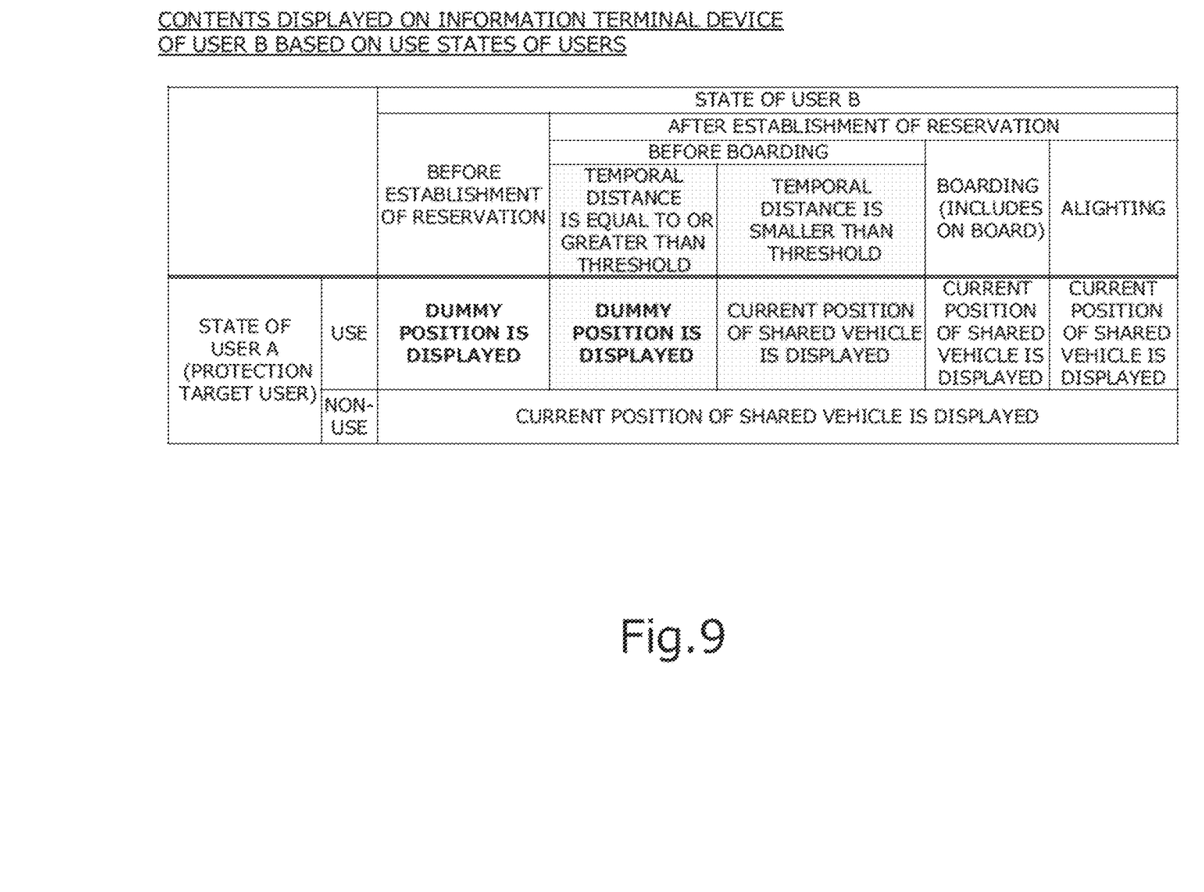
FIG. 9 is a diagram illustrating a modification of the display information that is displayed on the information terminal device of a user.

FIG. 9 is a diagram, according to the first modification, illustrating an example of the display information that is displayed on the information terminal device of a user belonging to a different group from the protection target user, the display information being based on use states of the shared vehicle 1 by the protection target user and the aforementioned user. A difference from FIG. 5 described above will be described. In FIG. 5 described above, the dummy position is displayed on the information terminal device of the user B when the user A is using the shared vehicle 1 before the user B and the use state of the user B is a state after the reservation is fixed and before the user B gets on board. In contrast, in the first modification, the dummy position is displayed on the information terminal device of the user B in a case where, in the aforementioned state, the temporal distance between the boarding position or the alighting position of the user A and the boarding position of the user B is equal to or greater than a threshold.

5. Second Modification

Figure 10:
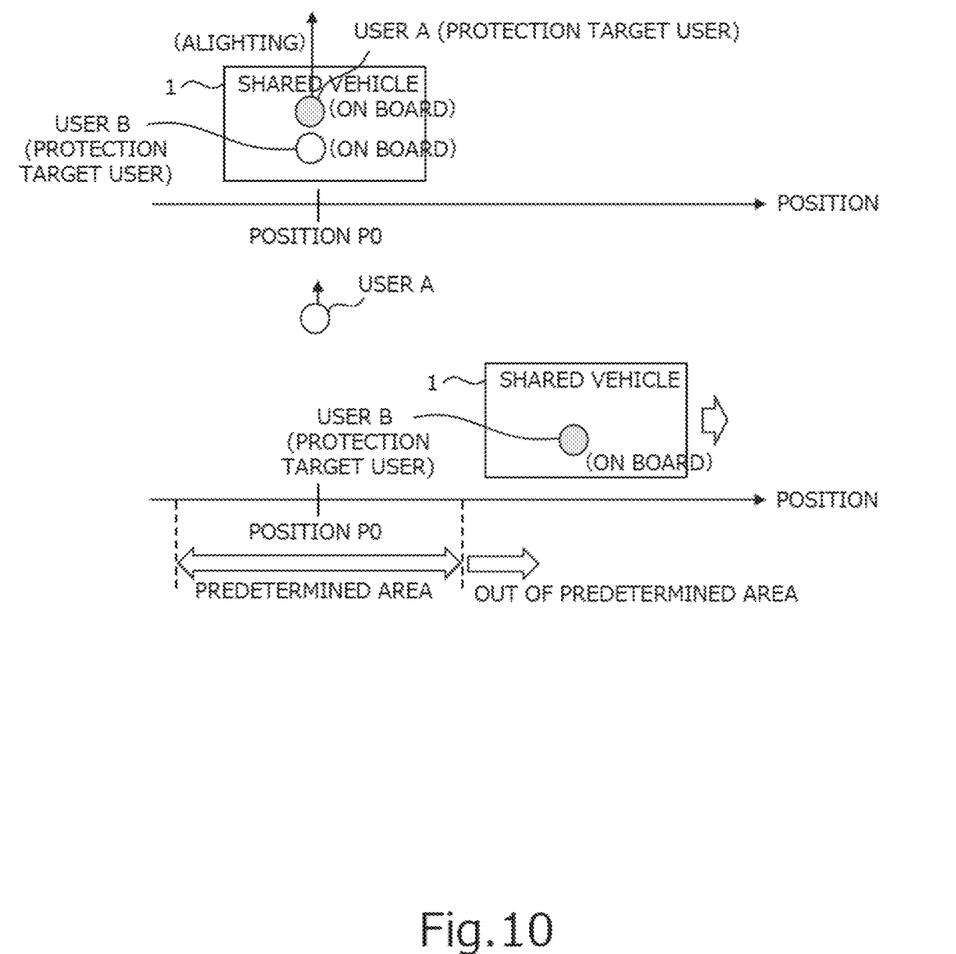
FIG. 10 is a diagram illustrating a modification of change of a protection target user.

FIG. 10 illustrates an example where the protection target user is changed to a user who does not belong to the same group as the protection target user. More specifically, when the user A who is the protection target user gets off the shared vehicle 1, privacy of the user A no longer needs to be protected. In this case, the right to receive privacy protection as the protection target user is taken away from the user A who is no longer on the shared vehicle 1. However, there is a possibility that the alighting position of the user A becomes known to a user who is scheduled to get on board at another boarding position after alighting of the user A. Accordingly, privacy of the user A is desirably protected for some time after alighting of the user A. Accordingly, in a second modification, the right to receive privacy protection is taken away from the user A when the position of the shared vehicle 1 moves out of a predetermined area around the alighting position of the user A.

Moreover, after the right is transferred from the user A to the user B, display contents transmitted to the information terminal device carried by the user A is switched from the first display information to the second display information. Furthermore, display contents transmitted to the information terminal device carried by the user B is switched from the second display information to the first display information. Privacy of a protection target user is thereby protected for a certain period of time even after alighting of the protection target user.

6. Third Modification

The control device 10 of the present disclosure is a server that is capable of performing communication with the information terminal device that is carried by a user who uses the shared vehicle 1, and the control device 10 is assumed to be installed inside a building. However, in a modification of the present embodiment, the control device 10 can not only be installed inside a building but can also be mounted on the shared vehicle 1.

Other Embodiments

The control device 10 of the present disclosure is also applicable in different embodiments. For example, it is possible to display the second display information on the screen of the information terminal device carried by a user who does not belong to the same group as the protection target user, but it is also possible not to display the position information on the screen. By not displaying the position information on the screen of the information terminal device carried by a user who does not belong to the same group as the protection target user, processing load related to generation of the display information by the control device 10 may be reduced.

What is claimed is:

1. A control device for controlling display contents that are displayed on screens of information terminal devices carried by a plurality of users who use a same shared vehicle, the control device comprising:
   an information processing device; and
   a communication device,
   wherein the information processing device is configured to:
      extract a group of users from the plurality of users based on passenger information of the plurality of users, the group of users being a group of users whose relationship with each other is a predetermined personal relationship;
      transmit to information terminal devices carried by the users belonging to the group, via the communication device, first display information indicating a current position of the shared vehicle; and transmit, in a case where a protection target user for whom a predetermined privacy protection requirement is satisfied is included in the group, second display information that is processed to protect privacy of the protection target user, to an information terminal device carried by a user not belonging to the group, via the communication device, the second display information is information for causing a dummy position different from the current position of the shared vehicle to be displayed on the information terminal device, the dummy position is indicated by at least one of any position on an actually travelled route, any position on a scheduled travel route, any position on a route different from a travel route, a latest position that is obtained in a state where a cycle of acquisition of the current position is slowed, and a heat map where resolution of display of the current position is reduced, the predetermined privacy protection requirement includes at least one of:
- a first requirement where a user belonging to the group is on board the shared vehicle before the user not belonging to the group, and a reservation for the shared vehicle is not yet fixed for the user not belonging to the group;
- a second requirement where the user belonging to the group gets on board the shared vehicle before the user not belonging to the group, the reservation for the shared vehicle is fixed for the user not belonging to the group, and the shared vehicle is positioned within a predetermined area around a position of boarding of the user belonging to the group on the shared vehicle; and
- a third requirement where the user belonging to the group gets off the shared vehicle before the user not belonging to the group gets on board the shared vehicle, the reservation for the shared vehicle is fixed for the user not belonging to the group, and the shared vehicle is positioned within a predetermined area around a position of alighting of the user belonging to the group from the shared vehicle, wherein, in a case where the position of the shared vehicle moves out of a predetermined area around a position of alighting of the protection target user from the shared vehicle, the information processing device is further configured to switch the display contents transmitted to an information terminal device carried by the protection target user from the first display information to the second display information.

2. The control device according to claim 1, wherein, in a case where a position of the shared vehicle moves out of the predetermined area around the position of alighting of the protection target user from the shared vehicle, the information processing device is configured to switch the display contents transmitted to the information terminal device carried by the user not belonging to the group from the second display information to the first display information.

3. The control device according to claim 1, wherein the second requirement and the third requirement each further include that a temporal distance between the current position of the shared vehicle and a position where the user not belonging to the group gets on board the shared vehicle is equal to or greater than a threshold.

4. The control device according to claim 1, wherein the personal relationship includes at least one of users whose reservations are made by a same person, users with a same address, and users with a same boarding position and a same alighting position.

5. A control method for controlling display contents that are displayed on screens of information terminal devices carried by a plurality of users who use a same shared vehicle, the control method comprising:
- extracting a group of users from the plurality of users based on passenger information of the plurality of users, the group of users being a group of users whose relationship with each other is a predetermined personal relationship;
- transmitting to information terminal devices carried by the users belonging to the group, via a communication device, first display information indicating a current position of the shared vehicle; and
- transmitting, in a case where a protection target user for whom a predetermined privacy protection requirement is satisfied is included in the group, second display information that is processed to protect privacy of the protection target user, to an information terminal device carried by a user not belonging to the group, via the communication device, the second display information is information for causing a dummy position different from the current position of the shared vehicle to be displayed on the information terminal device, the dummy position is indicated by at least one of any position on an actually travelled route, any position on a scheduled travel route, any position on a route different from a travel route, a latest position that is obtained in a state where a cycle of acquisition of the current position is slowed, and a heat map where resolution of display of the current position is reduced, the predetermined privacy protection requirement includes at least one of:
  - a first requirement where a user belonging to the group is on board the shared vehicle before the user not belonging to the group, and a reservation for the shared vehicle is not yet fixed for the user not belonging to the group;
  - a second requirement where the user belonging to the group gets on board the shared vehicle before the user not belonging to the group, the reservation for the shared vehicle is fixed for the user not belonging to the group, and the shared vehicle is positioned within a predetermined area around a position of boarding of the user belonging to the group on the shared vehicle; and
  - a third requirement where the user belonging to the group gets off the shared vehicle before the user not belonging to the group gets on board the shared vehicle, the reservation for the shared vehicle is fixed for the user not belonging to the group, and the shared vehicle is positioned within a predetermined area around a position of alighting of the user belonging to the group from the shared vehicle, wherein, in a case where the position of the shared vehicle moves out of a predetermined area around a position of alighting of the protection target user from the shared vehicle, switching the display contents transmitted to an information terminal device carried by the protection target user from the first display information to the second display information.

6. A non-transitory computer-readable storage medium storing a control program that is configured to cause a computer to execute:

extracting a group of users from the plurality of users based on passenger information of the plurality of users, the group of users being a group of users whose relationship with each other is a predetermined personal relationship;

transmitting to information terminal devices carried by the users belonging to the group, via a communication device, first display information indicating a current position of the shared vehicle; and transmitting, in a case where a protection target user for whom a predetermined privacy protection requirement is satisfied is included in the group, second display information that is processed to protect privacy of the protection target user, to an information terminal device carried by a user not belonging to the group, via the communication device, the second display information is information for causing a dummy position different from the current position of the shared vehicle to be displayed on the information terminal device, the dummy position is indicated by at least one of any position on an actually travelled route, any position on a scheduled travel route, any position on a route different from a travel route, a latest position that is obtained in a state where a cycle of acquisition of the current position is slowed, and a heat map where resolution of display of the current position is reduced, the predetermined privacy protection requirement includes at least one of:

a first requirement where a user belonging to the group is on board the shared vehicle before the user not belonging to the group, and a reservation for the shared vehicle is not yet fixed for the user not belonging to the group;

a second requirement where the user belonging to the group gets on board the shared vehicle before the user not belonging to the group, the reservation for the shared vehicle is fixed for the user not belonging to the group, and the shared vehicle is positioned within a predetermined area around a position of boarding of the user belonging to the group on the shared vehicle; and a third requirement where the user belonging to the group gets off the shared vehicle before the user not belonging to the group gets on board the shared vehicle, the reservation for the shared vehicle is fixed for the user not belonging to the group, and the shared vehicle is positioned within a predetermined area around a position of alighting of the user belonging to the group from the shared vehicle, wherein, in a case where the position of the shared vehicle moves out of a predetermined area around a position of alighting of the protection target user from the shared vehicle, switching the display contents transmitted to an information terminal device carried by the protection target user from the first display information to the second display information.

* * * * *